US006334142B1

(12) United States Patent
Newton et al.

(10) Patent No.: US 6,334,142 B1
(45) Date of Patent: Dec. 25, 2001

(54) METHOD FOR AUTOMATIC AND PERIODIC REQUESTS FOR MESSAGES TO AN E-MAIL SERVER FROM THE CLIENT

(75) Inventors: Eric Robert Newton; Simon John MacDonald; David Richard Cruickshank; Phil Clark, all of London (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/171,980

(22) PCT Filed: Apr. 8, 1998

(86) PCT No.: PCT/GB98/01030

§ 371 Date: Oct. 29, 1998

§ 102(e) Date: Oct. 29, 1998

(87) PCT Pub. No.: WO98/47268

PCT Pub. Date: Oct. 22, 1998

(30) Foreign Application Priority Data

Apr. 15, 1997 (EP) .................................................. 97302579

(51) Int. Cl.[7] ........................... G06F 15/16; G06F 15/177
(52) U.S. Cl. ........................... 709/206; 709/203; 709/217
(58) Field of Search .................................. 709/203, 217, 709/226, 206, 207, 218; 455/466; 364/514; 379/100.08

(56) References Cited

U.S. PATENT DOCUMENTS

| 5,093,918 | * | 3/1992 | Heyen et al. ......................... 395/725 |
| 5,177,680 | | 1/1993 | Tsukino et al. . |
| 5,276,869 | * | 1/1994 | Forrest et al. ......................... 709/206 |
| 5,493,692 | * | 2/1996 | Theimer et al. ..................... 455/26.1 |

(List continued on next page.)

FOREIGN PATENT DOCUMENTS

| 0375143 A2 | 6/1990 | (EP) . |
| 0662763 A2 | 7/1995 | (EP) . |
| WO 96/34341 | 10/1996 | (WO) . |

OTHER PUBLICATIONS

Casey, T. et al. "Secure automated document delivery", IEEE Annual Computer Security Applications Conference, ISBN: 0–8186–2006–4, pp. 348–356, Dec. 1989.*
Michaels, J.M. et al. "Accounting management for personal communications", IEEE Conference on Universal Personal Communications, ISBN: 0–7803–1823–4, pp. 602–606, Oct. 1994.*

(List continued on next page.)

Primary Examiner—Mark H. Rinehart
Assistant Examiner—Jason D. Cardone
(74) Attorney, Agent, or Firm—Nixon & Vanderhye P.C.

(57) ABSTRACT

To supply messages to an audience of Internet users, the messages are initially stored on an Internet server which is accessible by a group of Internet clients operated by Internet users, when a message is received at the server, it includes an information part and a data part. The data part includes at least one identifier specifying the intended audience of the message. In the server, the information part of the message is stored as an HTML file in a first store and the URL of the file containing the information part of the message together with the identifier or identifiers of the intended audience are stored in a second store. To view messages intended for a particular user on one of the clients, the client transmits requests automatically at periodic intervals to the server for new messages intended for the user. In response to each request, the server scans the fields in the second store to compile a list of URLs of messages intended for the user. The list is then transmitted to the client which then requests the HTML files for the messages specified on the list. The HITML files are then transmitted to the client where the messages are displayed.

10 Claims, 8 Drawing Sheets

U.S. PATENT DOCUMENTS

| | | | | |
|---|---|---|---|---|
| 5,675,507 | * | 10/1997 | Bobo, II | 364/514 |
| 5,689,805 | * | 11/1997 | Ayerst et al. | 370/312 |
| 5,742,763 | * | 4/1998 | Jones | 709/317 |
| 5,812,776 | * | 9/1998 | Gifford | 709/217 |
| 5,913,032 | * | 6/1999 | Schwartz et al. | 709/213 |
| 5,917,489 | * | 6/1999 | Thurlow et al. | 345/809 |
| 5,966,663 | * | 10/1999 | Gleason | 455/466 |
| 6,029,141 | * | 2/2000 | Bezos et al. | 705/27 |
| 6,038,601 | * | 3/2000 | Lambert et al. | 709/226 |
| 6,044,395 | * | 3/2000 | Costales et al. | 709/206 |
| 6,052,710 | * | 4/2000 | Sliba et al. | 709/203 |
| 6,189,027 | * | 2/2001 | Haneda et al. | 709/206 |

OTHER PUBLICATIONS

Clarke, T. et al. "Defense message system overview", IEEE MILC Conference Record, ISBN: 0–7803–2489–7, pp. 957–961, Nov. 1995.*

Tolly et al, "Grow Up Today's Lan–Based E–Mail Applications Are More Than Toys, But Less Than Tools", Data Communications, vol. 23, No. 16, Nov. 1, 1994, pp. 70–72, 74–76, 78, 80,82, 84, XP00471524.

Thimm et al, "A Mail–Based Teleservice Architecture for Archiving and Retrieving Dynamically Composable Multimedia Documents", Multimedia Transport and Teleservices, International Cost 237 Works Proceedings, Vienna, No. 13–15, 1994, Nov. 13, 1994, pp. 14–34, XP000585292.

"WPI World Patent Information Derwent" WPI World Patent Information Derwent,, vol. 46, No. 91, XP002071104 Week 9146, AN 91–337344 & ANON: "Expiry Date Marking Method for Electronic Mail" Research Disclosure, vol. 330, No. 36, Oct. 10, 1991.

Teunissen et al, "Multimedia Mail: A Colorful Business Application for Success", Information Networks and Data Communication, Proceedings of the IFIP TC6 International Conference on Information Networks and Data Communication, Funchal, Madeira Island, Portugal, Apr. 18–21, 1994, No. Conf. 5, Apr. 18, 1994, Veiga P;Dipak Khakhar (Eds), pp. 45–56, XP000593284.

* cited by examiner

METHOD FOR AUTOMATIC AND PERIODIC REQUESTS FOR MESSAGES TO AN E-MAIL SERVER FROM THE CLIENT

BACKGROUND OF THE INVENTION

This invention relates to a method of supplying messages.

In a well known method of transmitting messages to an intended audience, the messages are transmitted as e-mails to computers operated by members of the intended audience. However, as is also well known, messages transmitted as e-mails are prone to unpredictable delays. For some messages, such delays are unacceptable.

A system for storing messages and for the delivering the messages through a network is described in WO96/34341.

SUMMARY OF THE INVENTION

According to this invention, there is provided a method of supplying messages in which:

messages are stored on a server which is accessible by a group of clients operated by users, each message being stored by performing the following operations:

receiving the message at said server from one of said group of clients, said message comprising an information part and a data part, the data part including at least one identifier specifying the intended audience of the message;

storing the information part of the message as a file at an address in a first store;

storing said address and said at least one identifier in a second store; and messages intended for a particular user are viewed on one of said clients by performing the following operations:

said client transmitting requests automatically at periodic intervals to the server for messages intended for said particular user;

in response to each request, the server scanning the second store to compile a list of addresses of messages intended for said particular user;

the server transmitting files stored at addresses specified on said list to said client; and said client displaying messages received by the client.

In the method of this invention, because the messages are stored on the server as files and then transmitted to clients operated by intended recipients as files, they are not subjected to the unpredictable delays experienced by messages transmitted as e-mails. Also, because a client which is being used for viewing messages intended by a particular user transmits requests automatically at periodic intervals to the server for messages intended for the particular user, an up-to-date set of messages can be viewed by the particular user.

BRIEF DESCRIPTION OF THE DRAWINGS

This invention will now be described in more detail, by way of example, with reference to drawings in which.

DETAILED DESCRIPTION OF EXEMPLARY EMBODIMENTS

As is well known, the Internet is a combination of interconnected networks which can support transfer of communications between computers using the well established TCP/IP protocols. A computer which can access the Internet for transmitting and receiving communications protocols will be referred to as an Internet computer. Some Internet computers are configured to store information for retrieval by other computers. Computers which are configured to store information will be referred to as "servers" and computers which are configured to retrieve information from servers will be referred to as "clients". Some organisations operate a private network which can support transfer of communications using the TCP/IP protocols. Such a network is known as an intranet. Private intranets may be connected to the Internet. In this specification, the terms "Internet client" and "Internet server" are intended to include, respectively, a client or a server connected to a private intranet. Also, although the Internet as presently known uses the well established TCP/IP protocols for transferring communications, it is envisaged that other protocols may be used in the future. Accordingly, the term Internet is intended to included networks which are capable of transferring communications using other protocols.

Figure 1:
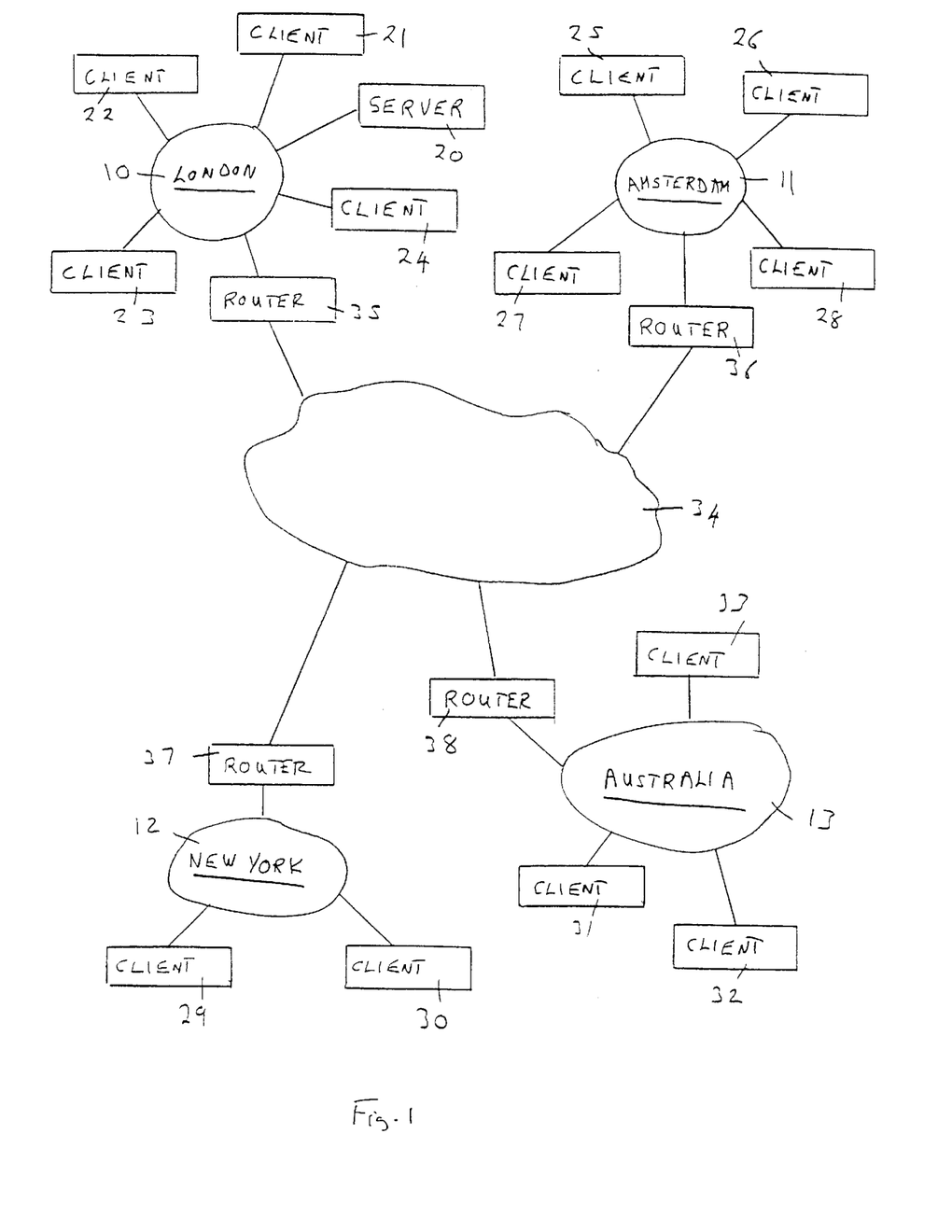
FIG. 1 shows a group of Internet clients which are able to post messages on, and receive messages from, an Internet server, in accordance with this invention.

Referring now to FIG. 1, there are shown four networks 10, 11, 12 and 13 belonging to a particular organisation and which are located, respectively, at London, Amsterdam, New York and Australia. An Internet server 20 and Internet clients 21 to 24 are connected to the network 10, Internet clients 25 to 28 are connected to the network 11, Internet clients 29, 30 are connected to the network 12 and Internet clients 31 to 33 are connected to the network 13. The clients 21 to 33 are operated by users who are members of the organisation. A particular user may predominately operate one of the clients 21 to 33. However, it may happen that a particular user operates more than one of the clients, for example as the user moves from one location to another. It may also happen that one of the clients 21 to 33 is operated by two or more users, for example a day shift user and a night shift user.

The networks 10 to 13 are connected, respectively, to routers 35 to 38. The routers 35 to 38 are interconnected by one of more further networks shown simply, in well known manner, as a cloud 34. The networks 10 to 13, the routers 35 to 38 and the networks 34 can support Internet communications. In addition to supporting transfer of communications using the TCP/IP protocols, the Internet also support services which use higher level, dedicated protocols. One of these services is the well known World Wide Web (the Web) service. In the Web service information is stored on servers as HyperText Mark-up Language (HTML) files. The address of a particular HTML file on a particular server is defined by the Universal Resource Locator (URL) of the file. An Internet client equipped with a Web browser can retrieve an HTML file from a Web server using the HyperText Transfer Protocol (HTTP). When an HTML file is transmitted across the Internet using the HTTP protocol, the HTTP information is wrapped in the TCP/IP protocol. When an HTML file is retrieved by a client using a Web browser, the file is interpreted by the browser and the textual and graphical information is then displayed appropriately on a display screen.

As will be described in more detail below, the server 20 and clients 21 to 33 are arranged to provide a message service for the users. In this message service, a user can operate one of the clients 21 to 33 to post a message on the server 20 and to specify the audience for whom the message is intended. The audience may be all of the users or a selected set of the users. For example, the audience could be all of the users in New York, all of the users who have a particular level of responsibility in the organisation, all of the users who perform a particular function within the organisation or all the night shift users. By operating one of the clients 21 to 33, a user may retrieve the messages intended for him or her.

The users of the clients 21 to 33 collectively form a defined group of users. The message service is not available to people outside this defined group. Although in this example the message service is provided by clients and a server which are connected to networks belonging to a particular organisation, the invention could also be implemented with a set of appropriately equipped clients and a server which are connected to the Internet without using a private network and which are operated by a defined group of users.

Figure 2:
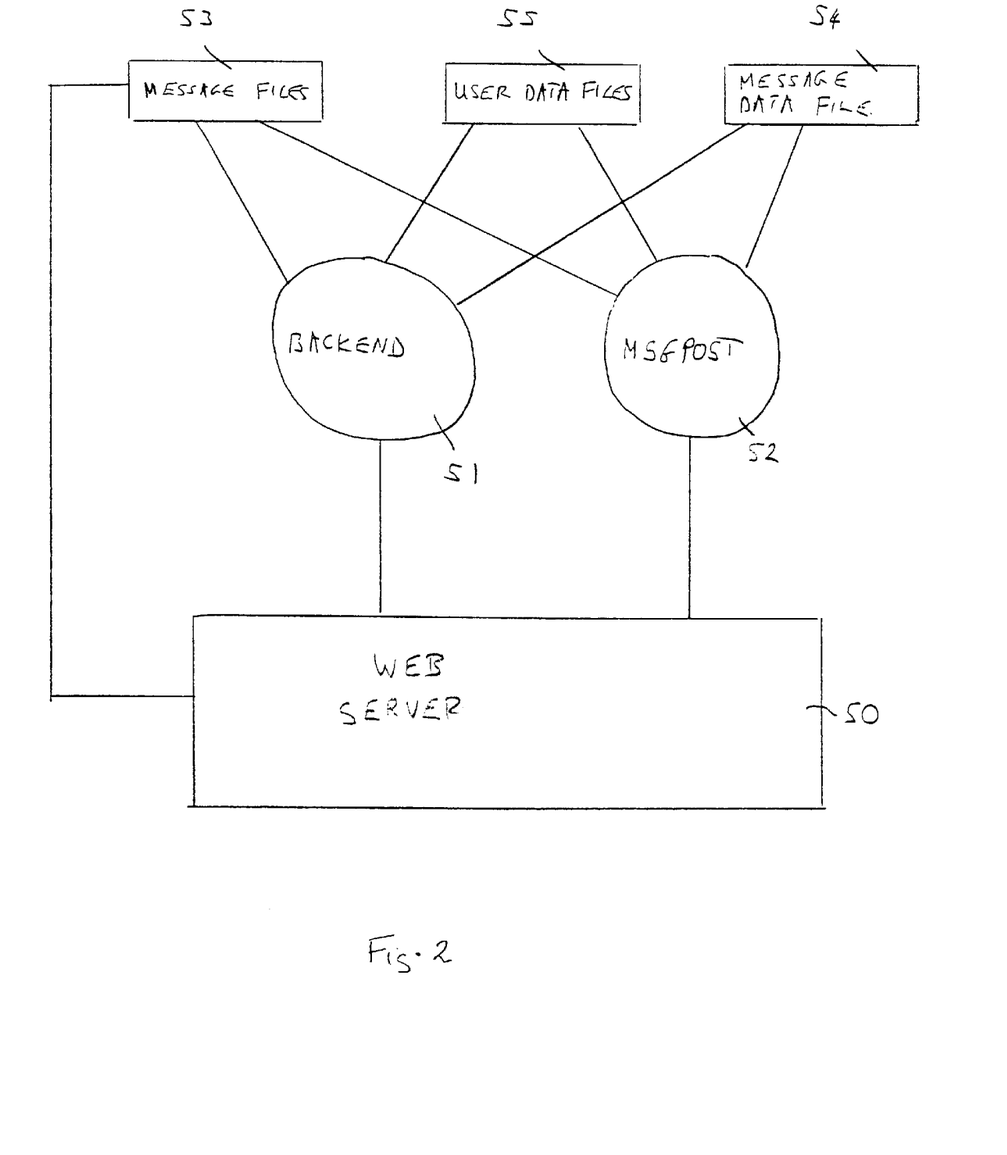
FIG. 2 is a block diagram of the programs installed on the Internet server shown in FIG. 1.

Referring now to FIG. 2, there are shown the software programs installed in server 20 to provide the message service. These programs comprise a program 50 which enables the server 20 to operate as a Web server, a program BACKEND 51 and a program MSGPOST 52. Software to enable a server to operate as a Web server is commercially available. The functionality of the programs BACKEND and MSGPOST will be described below. In order to provide the message service, the server 20 has also three stores 53, 54 and 55. As will be described in more detail below, the store 53 stores the information part of messages, the store 54 stores the data part of messages and store 55 stores data on the users of the information service. In this example, the stores 53, 54 and 55 are located in the same database and this database forms part of the server 20.

Figure 3:
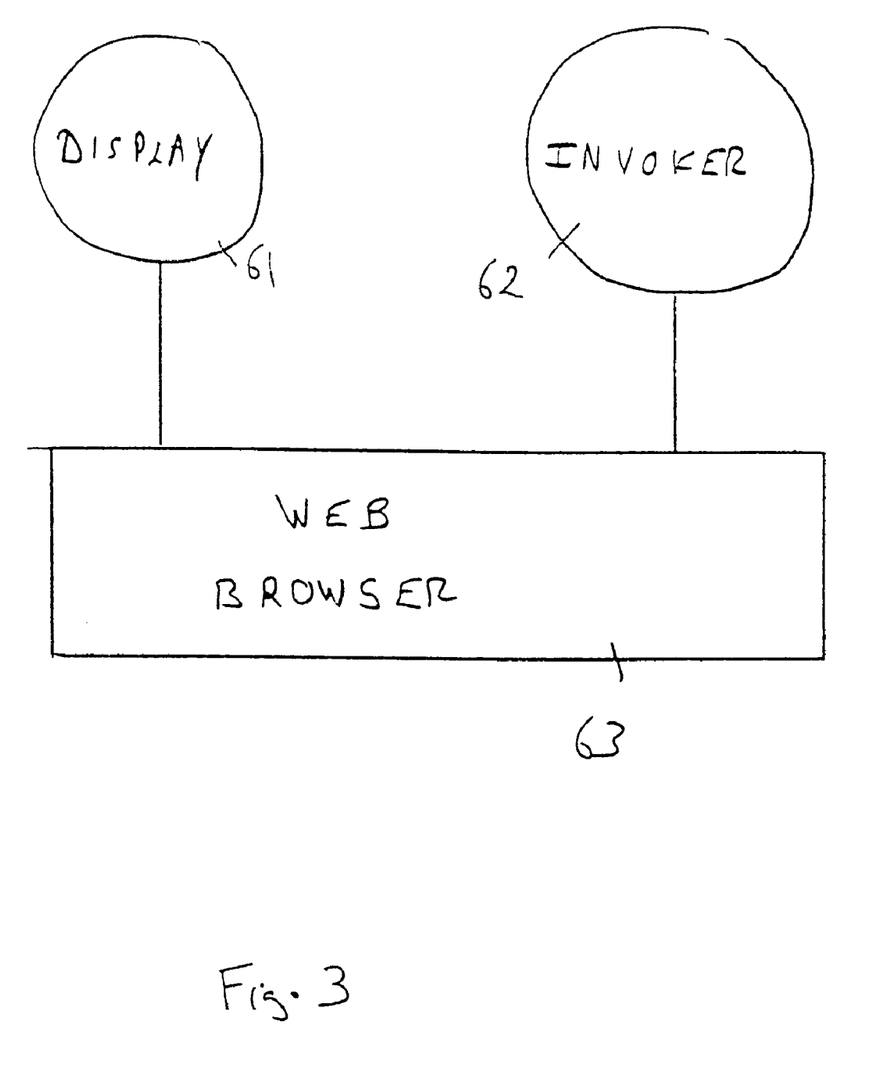
FIG. 3 is a block diagram of the software programs installed in each of the Internet clients shown in FIG. 1.

Referring now to FIG. 3, there are shown the programs which are used in each of the clients 21 to 33 to enable the clients to use the message service. These programs comprises a Web browser 63, a program DISPLAY 61 and a program INVOKER 62. Web browser programs are commercially available, and by way of example, the Web browser 63 may be a Netscape (Trademark) browser. The operation of the programs DISPLAY and INVOKER will be described below. On the first occasion that a client uses the message service, and as will be described below, the programs DISPLAY and INVOKER are downloaded to the client from the server 20. Thus, initially, in order to use the message service a client needs only a Web browser. In order for a user to use the message service, it is necessary for details of the user to be registered in the user data store 55 of server 20.

Figure 4A:
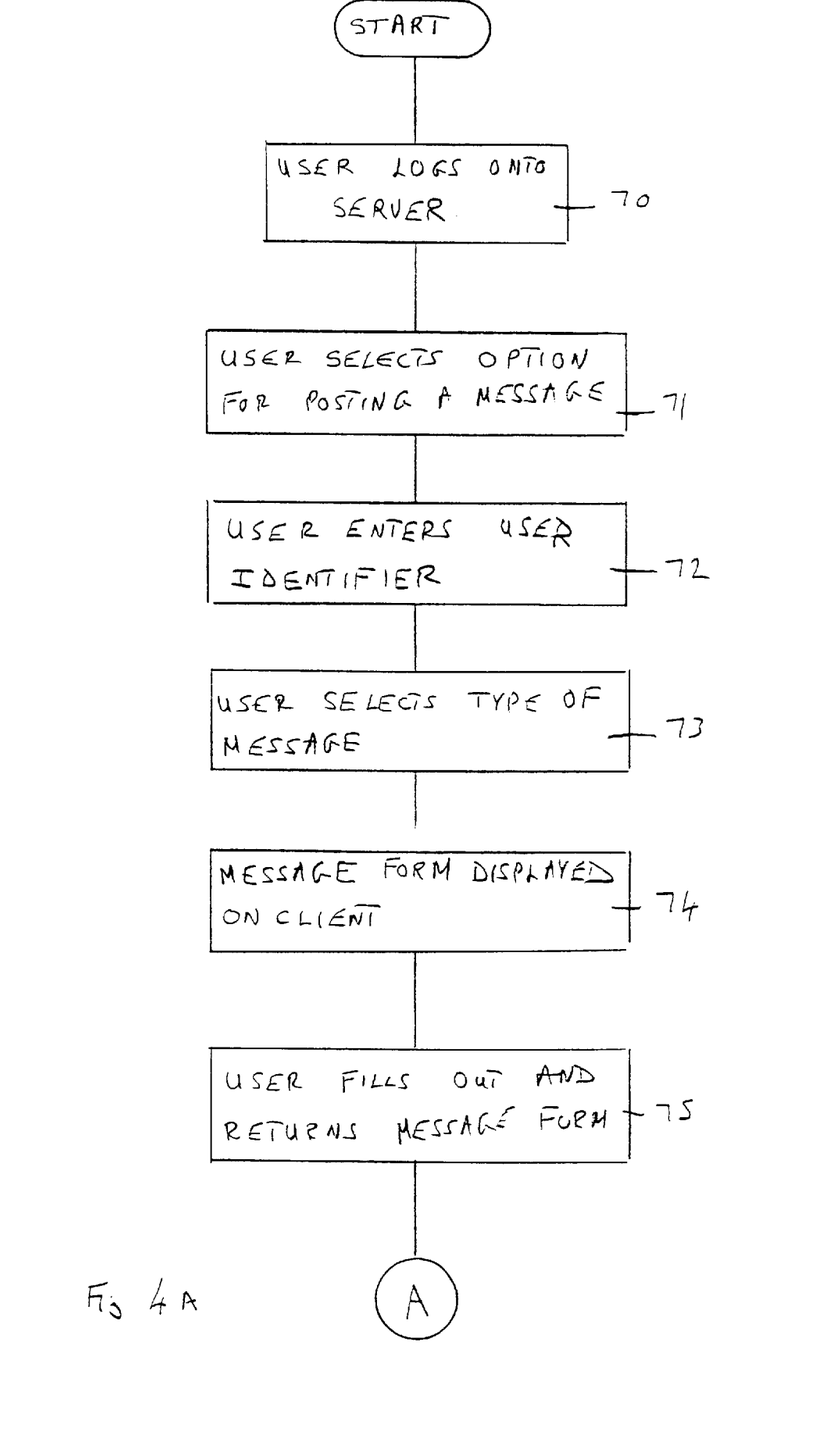
FIGS. 4A–4B is a flowchart of the operations which are performed when one of the Internet clients posts a message on the Internet server shown in FIG. 1.
Figure 4B:
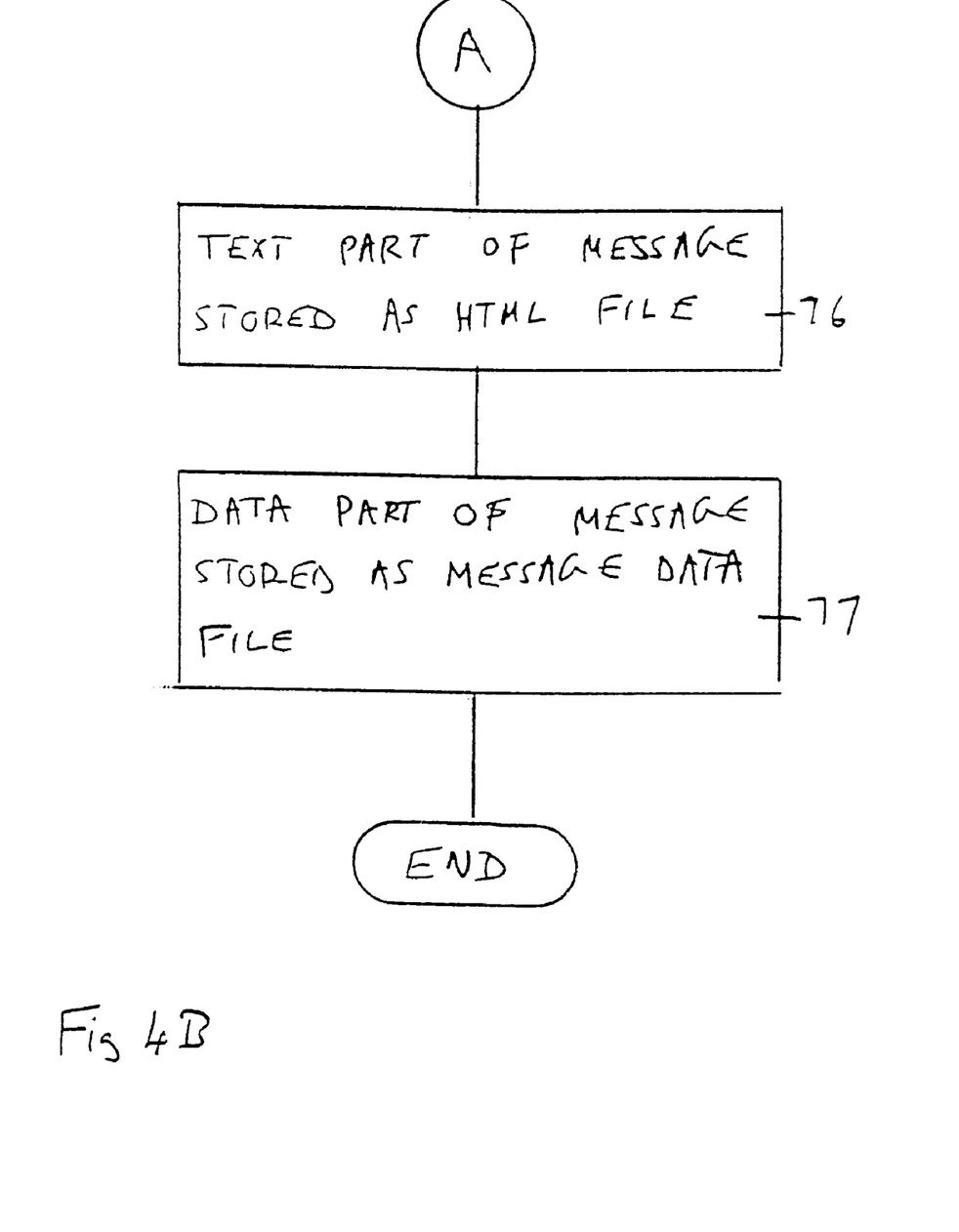

Referring now to FIGS. 4A–4B, there will now be described the series of operations which are performed when a user posts a message on the server 20.

In an initial step 70, the user operates one of the clients 21 to 33 to log on to the server 20. In order to do this, the user selects the URL for the message service provid ed by the server 20. The user is then invited to enter his user identifier and password. These are checked against data held in store 55.

In step 71, the server 20 invites the user to make a choice between the option for posting a message and the option for retrieving messages. The user selects the option for posting a message.

Then, in a step 72, the user again enters a user identifier. (The message service may be configured so that that the same user identifier is used in steps 70 and 72 or different identifiers are used in these two steps). The function of step 72 is to identify the user to the message service.

In this example, the service is capable of handling two types of messages. These are short messages which have a short text and normal messages which can have up to a whole page of text. Although in this example the messages are not capable of handling graphical information, the message service described in this example could easily be modified so as to handle graphical information and any other multimedia file type.

In a step 73, the user selects the type of message which he wishes to post. Next, in a step 74, the server sends a file to the user containing a form. This form contains a set of fields which, when completed, will contain the details of the message which is to be posted.

The fields of the form for posting a normal message are shown in Table 1 below.

TABLE 1

| EXPIRY: | time of expiry |
| DISPLAYTIME: | intended display time |
| AUDIENCE: | identifier(s) of audience |
| TEXT: | text of message |

The individual fields of the form for a normal message will now be described. Messages transmitted by the message service have a finite lifetime. The field EXPIRY contains the time of expiry of the message. As will be explained below, when a user uses a client to view his messages, the normal messages are displayed in turn and each message is displayed for a period of time which has been specified by the originator of the message. The field DISPLAYTIME contains the period for which the message should be displayed.

The AUDIENCE contains the identifier or identifiers of the intended audience of the message. If the originator of a message wishes to supply a message to all users of the message service, he enters in this field the identifier for all users. If the originator wishes to supply the message to one or more groups of the users, he enters the identifier or identifiers for such groups. Examples of such groups are all users located in Australia, or all night shift users or all users having a particular responsibility within the organisation. If the originator wishes to supply the message to one or more specified users, he enters the user identifier for each such user.

The field TEXT contains the text of the message.

The form for short messages has only the fields EXPIRY, AUDIENCE and TEXT.

In a step 75, the user fills out the form and returns it to the server 20.

Next, in a step 76, if the message is a normal message, the server 20 stores the information part of the message as an HTML file in store 53. The information part of the message is the contents of the field TEXT.

Lastly, in a step 77, if the message is a normal message, the server 20 stores the data contained in the fields EXPIRY, DISPLAYTIME and AUDIENCE, together with the URL of the HTML file in a file in the store 54. Thus, for each normal message, the URL of the file containing the information part of the message together with the identifier or identifiers of the intended audience of the message as well as other data relating to the message are stored in a file in store 54.

If the message is a short message, the text of the message together with the data from the fields EXPIRY and AUDIENCE are stored as a file in the store 54.

The fields in store 54 for storing data on each message are shown in Table 2 below.

TABLE 2

| ORIGINATOR: | identifier of originator |
|---|---|
| WHEN: | time of creation |
| EXPIRY: | time of expiry |
| TYPE: | short or normal message |
| AUDIENCE: | identifiers(s) of intended audience |
| DISPLAYTIME: | intended dispay time |
| ADDRESS: | URL of message or text of message |

The individual fields shown in Table 2 will now be described. The fields EXPIRY, AUDIENCE and DISPLAYTIME are the same as the corresponding fields of the form shown in Table 1. The field ORIGINATOR contains the identifier of the originator of the message and the field WHEN contains the time of creation of the message.

The field TYPE specifies whether the message is a short message or a normal message. In the case of a normal message, the field ADDRESS contains the URL of the file in the store 53 which contains the information part of the message. In the case of a short message, the field ADDRESS contains the actual text of the message.

Figure 5A:
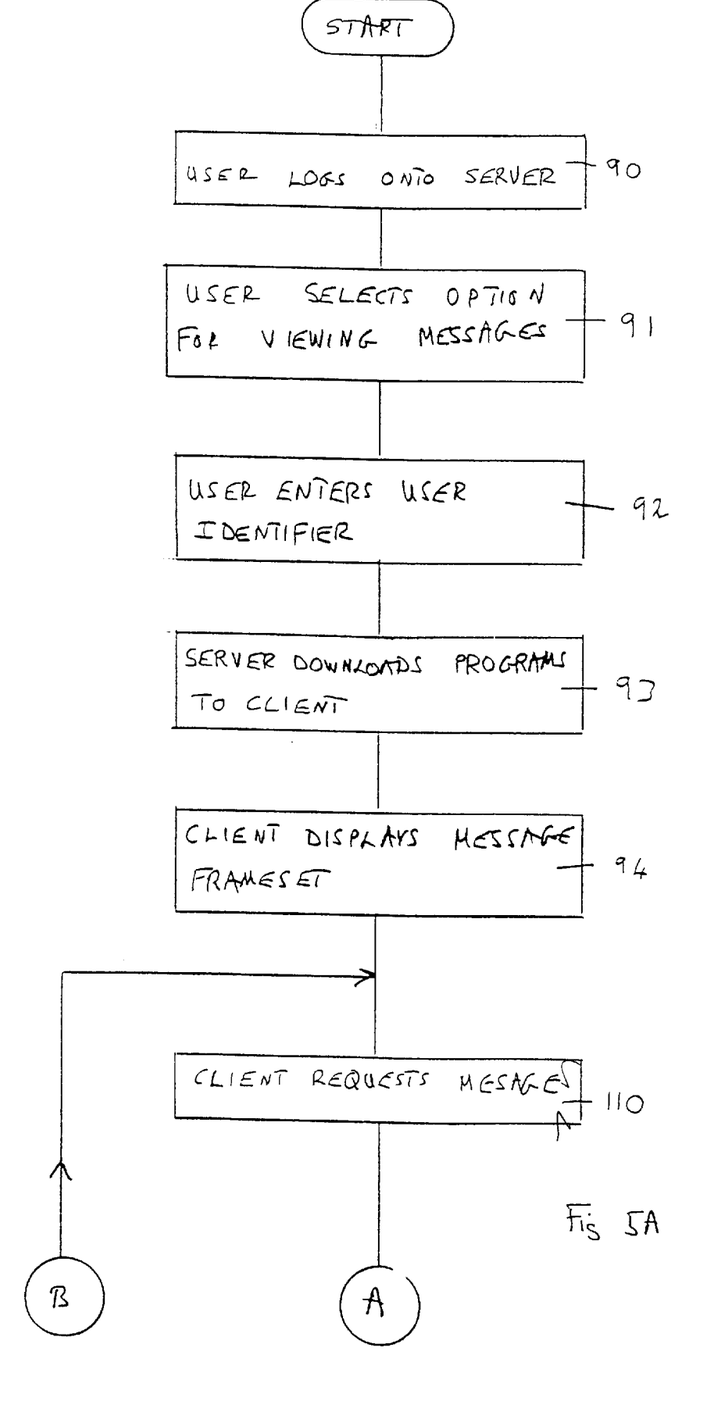
FIGS. 5A–5B is a flowchart showing the operations which are performed to enable one of the Internet clients to retrieve messages from the Internet server of FIG. 1.
Figure 5B:
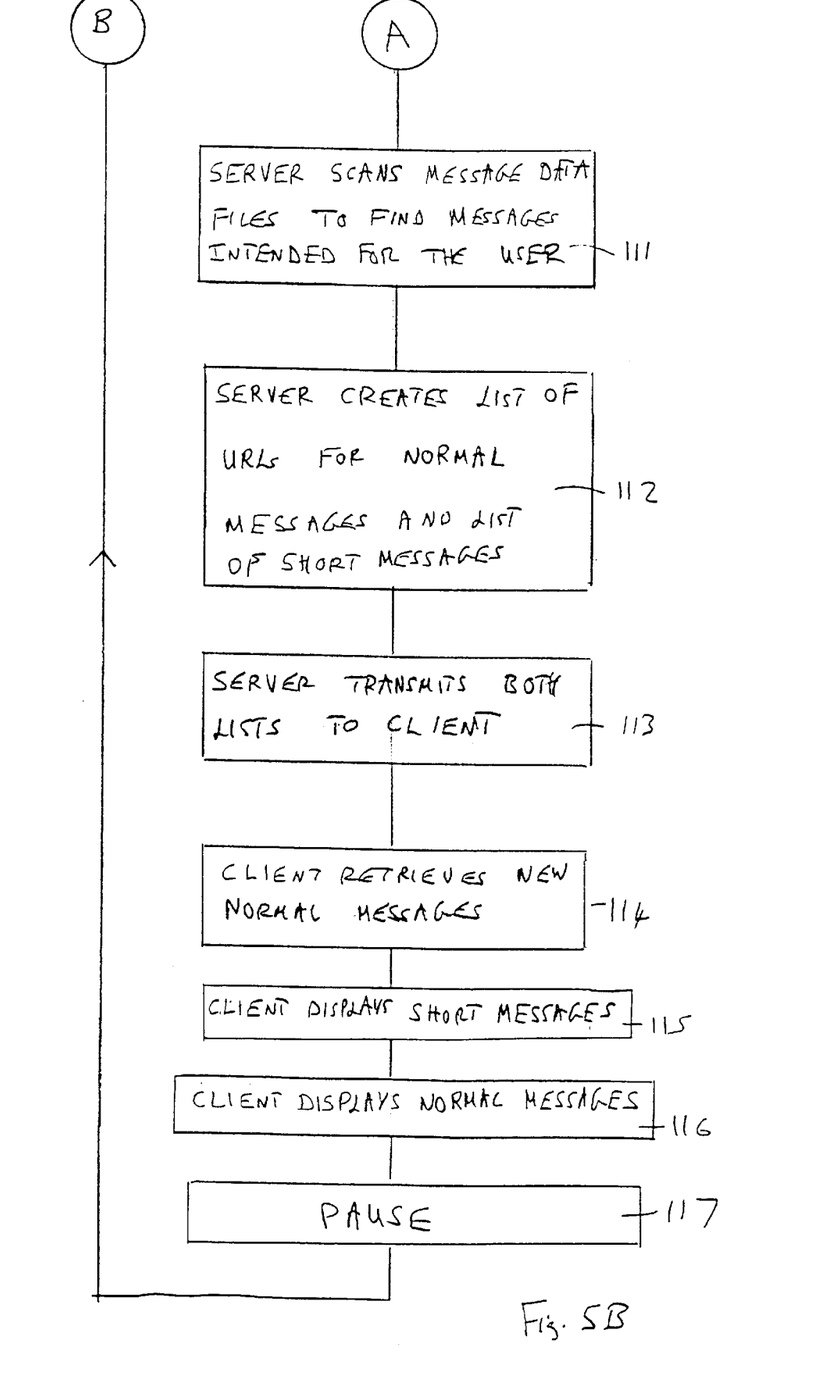

Referring now to FIGS. 5A–5B, there are shown the series of operations which are performed in order to enable a user to view the messages intended for the user on the screen of one of the clients 21 to 33.

In an initial step 90, the user operates the client so as to cause the client to log on to the server. In order to do this, the user selects the URL for the message service provided by the server 20. The user then is invited to enter his user identifier and password. In the server 20, the user identifier and password are checked against the data on the user stored in one of the files in store 55.

Next, in a step 91, the user is invited to choose between the option for posting a message and the option for viewing messages. The user chooses the option for viewing messages.

Next, in a step 92, the user is asked to enter his user identifier. This step is necessary in order to identify the user to the message service provided by a server 20.

Next, in a step 93, the server enters the program BACKEND. The program BACKEND downloads programs DISPLAY and INVOKER to the client.

Figure 6:
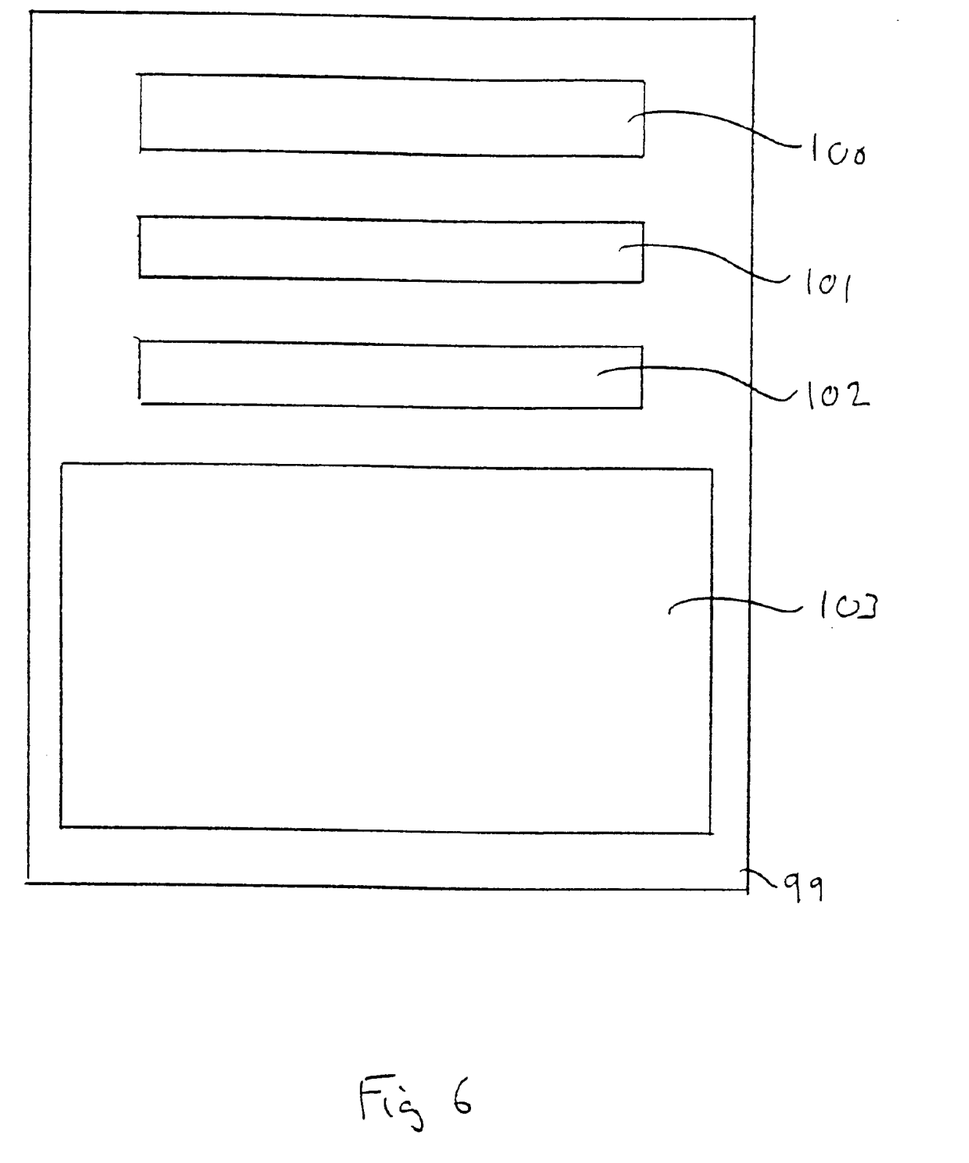
FIG. 6 shows the screen layout used to display messages on one of the clients.

Using the program DISPLAY, in a step 94, the client displays on its screen the message frameset 99. The message frameset is illustrated in FIG. 6. The frameset comprises a menu bar 100, a toolbar 101, and a frame 102 for displaying short messages and a frame 103 for displaying normal messages. After step 94, the clients calls the program INVOKER. The client and server then together perform a series of operations which are repeated automatically at intervals set by the administrator of the message service. In the present example the series of operations are repeated at 10 second intervals. The series of operations will be described with reference to steps 110 to 117.

In step 110, the client requests messages intended for the user.

In step 111, the server scans the message data in store 54 to find all messages (normal and short) intended for the user. Expired messages are ignored.

Next, in step 112, the server creates a first list of normal messages intended for the user and a second list of short messages intended for the user. Expired messages are ignored. On the first list, the data for each normal message comprises the URL of the HTML message file in store 53 and the intended display time.

For each short message, the data entered on the list comprises the text of the message. The two lists are then merged and formed into an HTML file which is transmitted to the client in a step 113.

Next, in a step 114, for each normal message on the list for which the client has not yet retrieved the message file, the client retrieves the message file from store 53. In a step 115, the client displays the short messages in the frame 102 of frameset 99. In the frame 102, the short messages are passed in turn from left to right. In a step 116, the client displays the normal messages in the frame 103. In the frame 103, each normal message is displayed for its intended displayed time.

In a step 117, the client pauses until the end of the 10 second period and then returns to step 110.

When an originator posts a message on the server 20, the originator can request a report which lists any members of the intended audience who have not retrieved the message. When an originator of a message requests such a report, the originator specifies the delay period between posting the message and establishing the report. When such a report is requested, at the end of the delay period, the server 20 checks whether any members of the intended audience have not retrieved the report. It then transmits a message containing a list of any members of the intended audience who have not retrieved the report.

In the message service described above, because the messages are transported as files rather than e-mails, they are not subjected to the unpredictable delays experienced by e-mails. Also, because a client which is being used to retrieve messages is arranged to request new messages at periodic intervals, the messages displayed will be almost up-to-date.

In the arrangement shown in FIG. 1, the message part of the messages are stored only in the message file store 53 of server 20. By way of modification, a replica of the message file store 53 could be created, for example in a server connected to the network 13. This would provide the advantage that each HTML message file would need to be transported only once from the network 20 to the network 13.

What is claimed is:

1. A method of supplying messages said method comprising:

storing messages on a server which is accessible by a group of clients operated by users, each message being stored by performing the following operations:

receiving the message at said server from one of said group of clients, said message comprising an information part and a data part, the data part including at least one identifier specifying the intended audience of the message;

storing the information part of the message as a file at an address in a first store;

storing said address and said at least one identifier in a second store; and viewing messages intended for a particular user on one of said clients by performing the following operations:

said client transmitting requests automatically at periodic intervals to the server for messages intended for said particular user;

in response to each request, the server scanning the second store to compile a list of addresses of messages intended for said particular user;

the server transmitting files stored at addresses specified on said list to said client; and said client displaying messages received by the client.

2. A method as in claim 1, in which in said receiving of a message at the server, the data part of the message includes an expiry time for the message.

3. A method as in claim 2 in which, in said scanning of the second store, the list excludes the addresses of messages which have expired.

4. A method as in claim 1, in which said receiving of a message at said server comprises:

receiving at the server a request from one of said clients to supply the message to the intended audience;

transmitting a file containing a form for completion by a user from the server to said client; and transmitting a file containing the form as completed by a user from said client to the server.

5. A method as in claim 1, in which said transmitting of files to said client comprises:

transmitting said list of addresses of messages to said client;

said client transmitting a request to the server for files stored at the addresses specified in said list; and transmitting files so requested from the server to said client.

6. A method as in claim 1 in which:

in said storing of the information part of the message, the message is stored as a HyperText Mark-Up Language (HTML) file;

in said storing of said addresses and said at least one identifier, said address is the Universal Resource Locator (URL) of said HTML file.

7. A method as in claim 1, in which the server is an Internet server, and said group of clients is a group of Internet clients.

8. A method of claim 1, wherein the server automatically transmits files stored at the address specified on said list to said client after scanning the second store in response to each said request.

9. A method of supplying messages comprising:

storing messages on a server which is accessible by a group of clients operated by users, each message being stored by performing the following operations:

receiving the message at said server from one of said group of clients, said message comprising an information part and a data part, the data part including at least one identifier specifying the intended audience of the message;

storing the information part of the message as a file at an address in a first store;

storing said address and said at least one identifier in a second store; and viewing messages intended for a particular user on one of said clients by performing the following operations:

said client transmitting requests automatically to the server for messages intended for said particular user;

in response to each request, the server scanning the second store to compile a list of addresses of messages intended for said particular user;

the server transmitting files stored at addresses specified on said list to said client; and said client displaying messages received by the client.

10. A method of claim 9, wherein the server automatically transmits files stored at the address specified on said list to said client after scanning the second store in response to each said request.

* * * * *